United States Patent
Koci et al.

(10) Patent No.: US 9,909,489 B1
(45) Date of Patent: Mar. 6, 2018

(54) PISTON FLUID PASSAGES FOR REDUCED SOOT

(71) Applicant: Caterpillar Inc., Peoria, IL (US)

(72) Inventors: Chad Palmer Koci, Washington, IL (US); Kenth Svensson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/286,286

(22) Filed: Oct. 5, 2016

(51) Int. Cl.
    *F02B 23/06* (2006.01)
    *F02F 3/26* (2006.01)
    *F02F 3/28* (2006.01)

(52) U.S. Cl.
    CPC ...... *F02B 23/0627* (2013.01); *F02B 23/0648* (2013.01); *F02F 3/28* (2013.01)

(58) Field of Classification Search
    CPC .. F02B 23/06; F02B 23/0627; F02B 23/0648; F02F 3/26; F02F 3/28
    See application file for complete search history.

(56) References Cited

U.S. PATENT DOCUMENTS

| | | | |
|---|---|---|---|
| 2,036,724 A * | 4/1936 | Roth | F01L 7/02 123/45 R |
| 4,572,123 A | 2/1986 | Evans | |
| 4,898,135 A | 2/1990 | Failla et al. | |
| 5,477,822 A * | 12/1995 | Haghgooie | F02B 19/02 123/286 |
| 7,004,140 B2 | 2/2006 | Kim | |
| 8,443,716 B2 | 5/2013 | Keller | |
| 8,646,428 B2 | 2/2014 | Eismark et al. | |
| 8,967,129 B2 * | 3/2015 | Mueller | F02B 3/00 123/193.4 |
| 2015/0107543 A1 | 4/2015 | Bowing et al. | |
| 2015/0308371 A1 | 10/2015 | Eismark | |
| 2017/0145899 A1 * | 5/2017 | Singh | F02B 19/18 |

FOREIGN PATENT DOCUMENTS

| | | | | |
|---|---|---|---|---|
| JP | S5681218 A | | 7/1981 | |
| JP | S62291432 A | | 12/1987 | |
| JP | S6318126 A | | 1/1988 | |
| JP | H03290020 A | | 12/1991 | |
| JP | H06248953 A | | 9/1994 | |
| JP | H08105325 A | | 4/1996 | |
| JP | H11229880 A | | 8/1999 | |
| JP | H11229881 A | | 8/1999 | |
| JP | 2007071089 A | * | 3/2007 | ............. F02F 3/26 |

* cited by examiner

*Primary Examiner* — Hieu T Vo

(74) *Attorney, Agent, or Firm* — Miller, Matthias & Hull

(57) ABSTRACT

An internal combustion engine may have an engine block having a plurality of cylinders. The internal combustion engine may also have a piston reciprocatingly mounted with each cylinder and defining a combustion chamber therebetween. The internal combustion engine may also be configured with a fuel injector communicating fuel to the combustion chamber, the fuel creating a plurality of flame plumes when ignited. The internal combustion engine may also have a piston crown extending from the piston and defining a piston bowl, the piston crown including a circumferential wall terminating in a top ledge. Further, the internal combustion engine may include a plurality of fluid passageways in the piston crown, each fluid passageway including an ingress in the top ledge and an egress in the circumferential wall proximate the piston bowl.

20 Claims, 7 Drawing Sheets

PISTON FLUID PASSAGES FOR REDUCED SOOT

TECHNICAL FIELD

The present disclosure generally relates to internal combustion engines and, more particularly, relates to pistons of internal combustion engines.

BACKGROUND

The pistons of internal combustion engines typically include a cylindrical base that has a bottom portion connected to a crank shaft by a connecting rod or the like, and a top portion or piston crown opposite the bottom portion. The piston crown cooperates with the cylinder head to define a combustion chamber. It is within the combustion chamber that air and fuel are mixed and ignited.

The piston crown is typically bowl-shaped and defined by a circumferential wall that extends from the cylindrical base of the piston. The circumferential wall of the piston may also be known as the piston bowl wall. A fuel injector is typically mounted in the cylinder head and extended into the combustion chamber to communicate fuel to the combustion chamber prior to ignition. Upon ignition, the resulting flame plumes flow radially outward and impinge against the piston bowl wall. When the flame plumes collide with the piston bowl wall, a stagnation point is created around the point where flame plumes hit the piston bowl wall. Such stagnation points cause the momentum of the flame plumes to be reduced.

While effective, such pistons within internal combustion engines, be they Otto or Diesel engines, have difficulties in reducing soot formation and increasing soot oxidation. More specifically, as soot results from incomplete combustion of hydrocarbons, pistons with traditional piston geometries may not have sufficient fuel-air mixing to avoid such incomplete combustion. Typical diesel combustion systems rely on fuel spray and combustion chamber interaction to mix fuel and air quickly for ignition and combustion. Ignition is caused by the compression of mainly air (which may typically include recirculated exhaust gas (EGR)) to a sufficient temperature and density through the piston compression stroke before fuel injection. A combustion chamber formed by a piston reciprocating within a cylinder closed by a cylinder head is typically utilized to help mix the fuel with the air to thereby reduce soot formation and increase soot oxidation. However, a problem associated with such traditional piston design is that flame plumes travelling from a fuel injector within the combustion chamber may interact and collide, thereby increasing the soot emissions. Accordingly, a problem that the piston design may try to avoid is to prevent flame plume interaction. If the piston can reduce the flame plume interaction, then soot oxidation may be increased, and the net soot formation, where the net soot formation is equal to the soot formation minus the soot oxidation, may decrease. However, reducing flame plume interaction may be harder and more costly under a traditional piston geometry for a piston located within a typical internal combustion engine.

Another problem with traditional piston design is that unused air and gas may flow in and out of the piston bowl without any interaction with the fuel-rich region of the combustion chamber. Although flame plumes are formed and travel within the piston bowl, the fuel spray and combustion chamber interaction may not be enough to prevent a significant amount of unused air and fuel from leaving the piston without mixing with the fuel-rich region and combusting. In other words, the geometry of the piston may have limitations in ensuring an efficient flow of air to mix with the fuel region in the piston bowl.

Pistons of the type generally described above are known in the art. For example, Japanese Patent No. JPH1122988 and entitled "Combustion Chamber of Direct Injection Diesel Engine," discloses a method for promoting the mixture of air and spray fuel within a cavity by reducing the intake swirl and dispersing the spray fuel while utilizing the intake swirl and squish flow. In another example, U.S. Pat. No. 8,646,428 entitled "Piston Positioned for Reciprocal Movement in a Combustion Engine Cylinder," discloses a piston positioned for reciprocal movement in a combustion engine cylinder wherein protrusions are arranged half way between flame plume impingement areas. However, improved combustion and reduced soot formation continue to be problematic in the field.

In view of the foregoing disadvantages with pistons with traditional geometries, a need exits for a solution which provides a more reliable and efficient way to increase the beneficial mixing of air and fuel within the piston bowl to thereby reduce flame plume interaction and increase soot oxidation. The present disclosure is directed at addressing one or more of the deficiencies and disadvantages set forth above. However, it should be appreciated that the solution of any particular problem is not a limitation on the scope of this disclosure or of the attached claims except to the extent expressly noted.

SUMMARY OF THE DISCLOSURE

In one aspect of the present disclosure, an internal combustion engine is disclosed. The internal combustion may include an engine block having a plurality of cylinders. The internal combustion engine may also include a piston reciprocatingly mounted within each cylinder defining a combustion chamber therebetween. The internal combustion engine may also include a fuel injector communicating fuel to the combustion chamber, the fuel creating a plurality of flame plumes when ignited. The internal combustion engine may also include a piston crown extending from the piston and defining a piston bowl. The piston crown may include a circumferential wall terminating in a top ledge. The internal combustion engine may also include a plurality of fluid passageways in the piston crown. Each fluid passageway may include an ingress in the top ledge and an egress in the circumferential wall proximate the piston bowl.

In another aspect of the present disclosure, a piston is disclosed. The piston may have a cylindrical base and a circumferential wall extending form the cylindrical base. The piston may also include a piston bowl defined by the cylindrical base and the circumferential wall. The piston may also include an fluid passageway configured within the circumferential wall to receive unburned gas from the piston bowl through an ingress in a top ledge of the circumferential wall and transport the unburned gas into the piston bowl through an egress in the circumferential wall. The fluid passageway guides the unburned gas to a region with a higher equivalence ratio.

In a further aspect of the present disclosure, a method for operating an internal combustion engine is described. The method may comprise providing a piston within a cylinder. The piston may have a piston crown with a plurality of fluid passageways therein. The piston crown may define a piston bowl. The method may also comprise injecting fuel into the piston bowl. The method may also comprise igniting the fuel and generating a plurality of flame plumes. The method may also include compressing unburned gas into one of the plurality of fluid passageways. The method may also include guiding the unburned gas within each fluid passageway to exit into the piston bowl to interact with the plurality of flame plumes travelling within the piston bowl.

These and other aspects and features will be more readily understood when reading the following detailed description in conjunction with the accompanying drawings.

While the following detailed description is given with respect to certain illustrative embodiments, it is to be understood that such embodiments are not to be construed as limiting, but rather the present disclosure is entitled to a scope of protection consistent with all embodiments, modifications, alternative constructions, and equivalents thereto.

DETAILED DESCRIPTION

Figure 1:
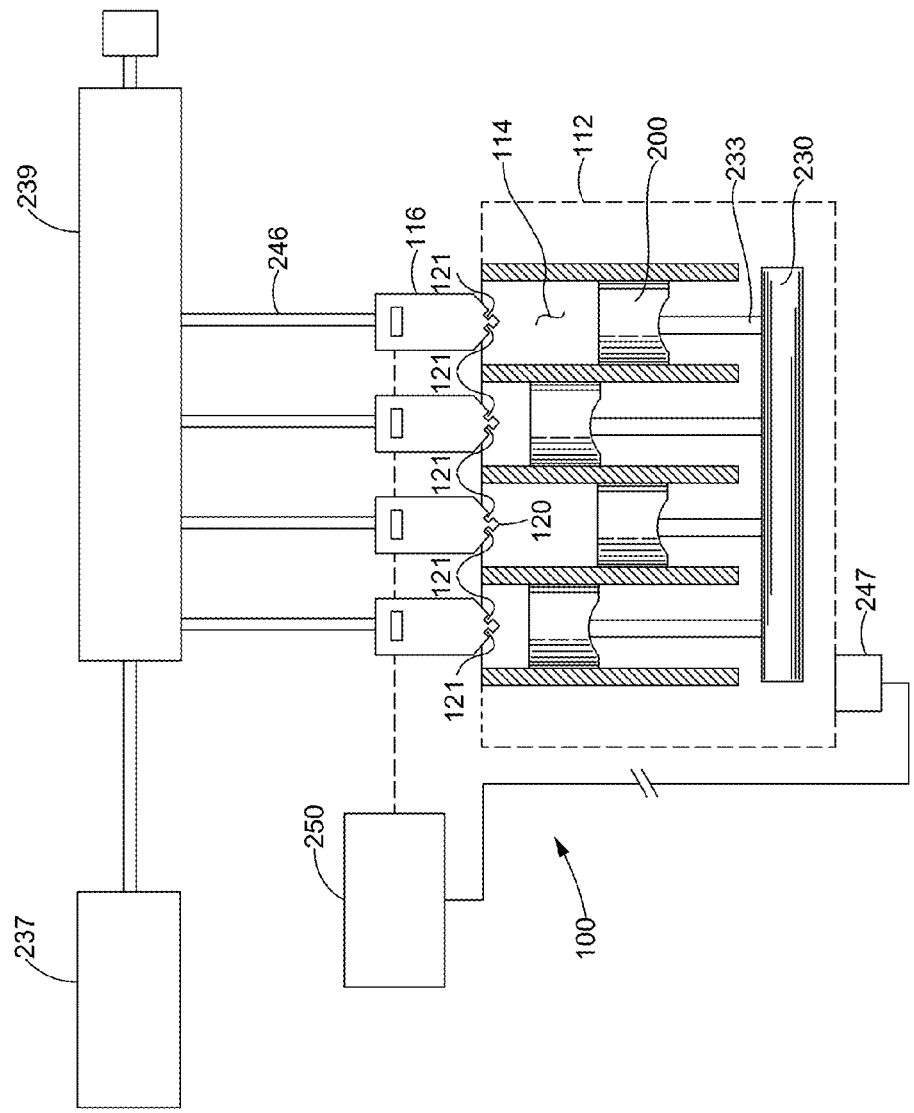
FIG. 1 is a schematic partially sectioned side view of an internal combustion engine in accordance with the present disclosure.

Referring now to the drawings and with specific reference to FIG. 1, an exemplary embodiment of an internal combustion engine 100 is depicted. With continued reference to FIG. 1, the internal combustion engine 100 is shown to include an engine block 112 with a plurality of cylinders 114 formed therein. Fuel injectors 116 may be disposed at more than one location relative to the block 112. The fuel injectors 116 may extend partially into each of the cylinders 114 to direct liquid fuel or the like therein. The fuel injectors 116 may include a fuel injector tip 120 with a plurality of orifices 121 that direct fuel in a plurality of radial directions into the associated cylinders 114.

The internal combustion engine 100 also includes a plurality of pistons 200 reciprocating within the plurality of cylinders 114. Each of the pistons 200 is movable to, among other things, increase cylinder pressures and temperatures sufficient to cause ignition of fuel as is well known in Diesel engines. Each piston 200 is coupled to a crankshaft 230 via a connecting rod 233 to cause rotation of the crankshaft 230. The internal combustion engine 100 may also include a fuel source 237. The fuel source 237 may be connected with each of the fuel injectors 116 by a common rail 239 or use unit injectors or the like and a plurality of supply passages 246. The internal combustion engine 100 may also comprise one or more sensors 247 to sense values indicative of engine speed or engine load or the like. The internal combustion engine 100 may also include a controller 250 hereinafter referred to as an engine control module (ECM) 250.

Figure 2:
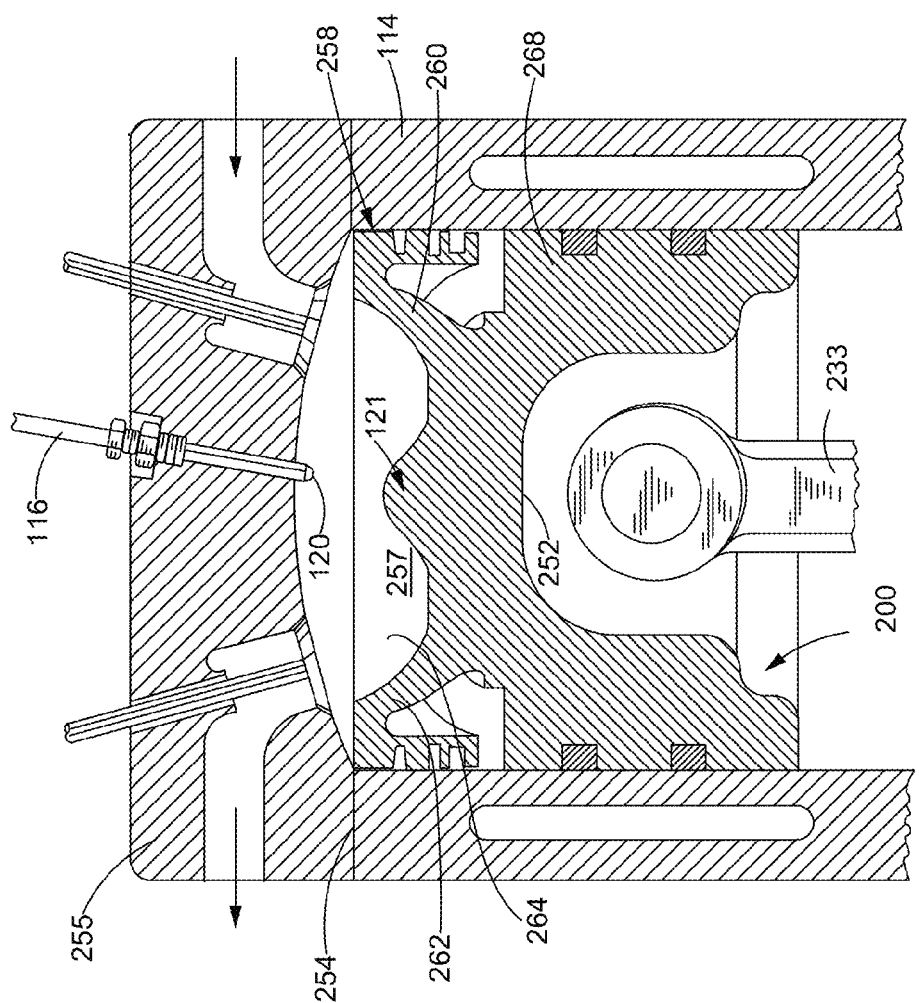
FIG. 2 is a sectional view of a representative piston and cylinder combination.

FIG. 2 illustrates a cross-section of one cylinder 114 and piston 200 combination in more detail. The piston 200 is shown connected to the connecting rod 233 at its bottom end 252. The cylinder 114 is closed at its top end 254 by a cylinder head 255 to define a combustion chamber 257 between an upper end 258 of the piston 200 and the cylinder head 255. The piston 200 may be topped with a piston crown head 260 at its upper end 258. The piston crown 260 may include a circumferential wall 262 surrounding a piston bowl 264. The fuel injector 116 may be arranged to discharge fuel in a radially outward spray pattern 266 into the piston bowl 264 (see FIG. 3 with respect to the spray pattern 266). A cylindrical base 268 of the piston 200 is also illustrated.

Figure 3:
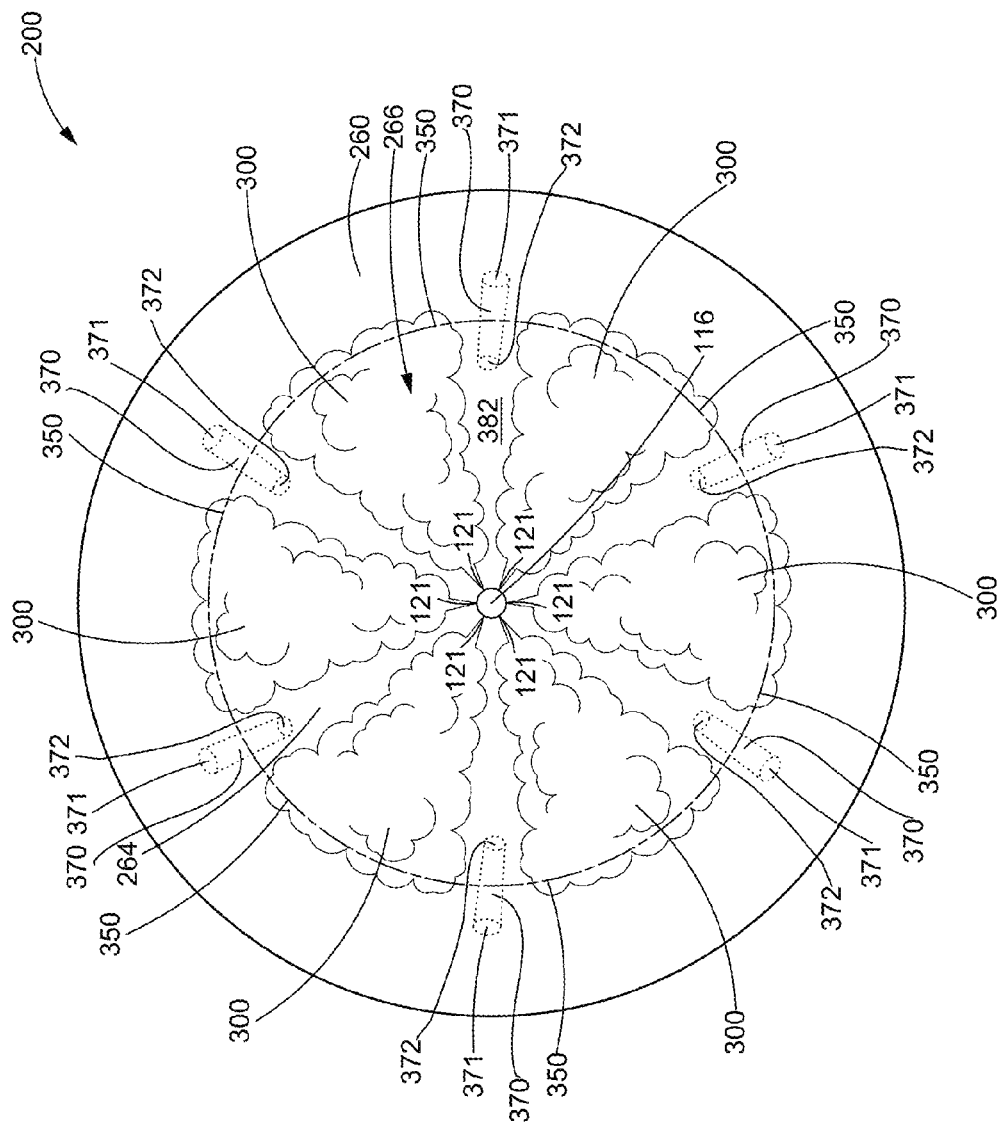
FIG. 3 is a top view of a piston in accordance with the present disclosure.

In operation, when fuel is injected and ignited, a plurality of distinct flame plumes 300 extend radially outward from each injection orifice 121 toward the circumferential wall 262 as shown in the top view of FIG. 3. Six flame plumes 300 are illustrated, however, it is to be understood that the present disclosure is not limited to necessarily injecting only six flame plumes 300 as more or less may be provided. In any event, the flame plumes 300 are shown expanding as they move radially outward. Unburned gas 305 (illustrated in more detail in FIG. 6) within the bowl 264 may not always interact with the flame plumes 300 and continue to flow toward the piston crown 260 without interacting with the flame plumes 300. But for the provisions of the present disclosure, there would be an incomplete mixing of the flame plumes 300 and unburned gas 305 that would increase the soot formation within the piston bowl 264. However, the present disclosure improves upon the prior art in this regard by providing fluid passageways 370 in the piston crown 260. The fluid passageways 370 may also include ingresses 371 to receive the unburned gas 305 and egresses 372 that enable the unburned gas 305 to exit into the piston bowl 264. The fluid passageways 370 may enable the piston crown 260 to compress the unburned gas 305 into the fluid passageways 370 to allow the unburned gas 305 to flow into the piston bowl 264 and interact with the flame plumes 300 for improved mixture and combustion and increased soot oxidation. This process will be explained in further detail with respect to FIGS. 4 and 5.

Figure 4:
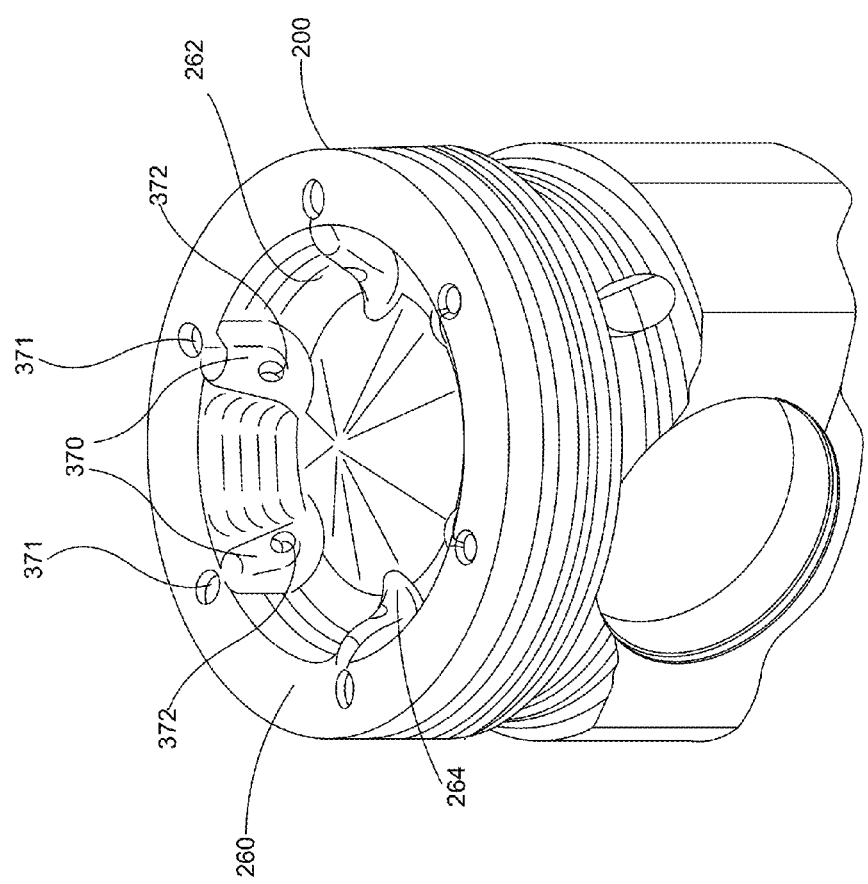
FIG. 4 is a perspective view of a piston in accordance with the present disclosure.

Turning to FIG. 4, a perspective view of a piston 200 and piston bowl 264 is illustrated for better understanding. As explained above, a plurality of flame plumes 300 may travel radially outward within the piston bowl 264 at a given time. Six fluid passageways 370 with corresponding ingresses 371 and egresses 372 are illustrated.

To be clear, however, each piston bowl 264 for each piston 200 may contain more or less than six fluid passageways 370. Each piston 200 in another exemplary embodiment may have as many as sixteen or more fluid passageways 370. The six fluid passageways 370 are illustrated as an example in FIG. 4 for ease of understanding. With prior art designs, the flame plumes 300 may also interact with each other instead of with the unburned gas 305. Soot formation within the piston bowl 264 may increase as a result.

To allow the unburned gas 305 that has reached the circumferential wall 262 to mix with the flame plumes 300, and to reduce the likelihood of flame plumes 300 interacting with each other and increasing the soot formation within the piston bowl 264, the present disclosure provides fluid passageways 370 configured within the piston crown 260 as illustrated in FIG. 4. In doing so, the unburned gas 305 can flow from the piston crown 260 into the piston bowl 264 and mix with the flame plumes 300 within the piston bowl 264. Further, each fluid passage 370 in the piston bowl 264 may extend inward toward the center of the piston bowl 264. As such, the unburned gas 305 that exits the fluid passageways 370 will more likely flow toward the center of the piston bowl 264, and thereby mix with the flame plumes 300 in the piston bowl 264.

In the depicted embodiment, when the unburned gas 305 has reached the piston crown 260, the piston crown 260 may then compress the unburned gas 305 into the fluid passageways 370. The ingresses 371 will receive the unburned gas 305 which has been compressed by the piston crown 260. The unburned gas 305 may then flow through the fluid passageways 370. The fluid passageways 370 may have either a straight or curved path, or a mixture of a straight or curved path which will be illustrated in more detail in FIG. 5. The unburned gas 305 may then exit the fluid passageways 370 through the egresses 372. After the unburned gas 305 exits the egresses 372, the unburned gas 305 may then flow back toward the center of the piston bowl 264. As explained above, each of the fluid passageways 370 are configured to extend inward toward the center of the piston bowl 264. As such, once the unburned gas 305 exits the egresses 372, the unburned gas 305 will then flow toward the center of the piston bowl 264. Accordingly, the piston bowl 264 may then have an increased circulation of unburned gas 305 interacting with the flame plumes 300. The flame plumes 300 will also be less likely to interact with each other. Therefore, soot oxidation within the piston bowl 264 may be promoted while soot formation may be reduced.

Figure 5:
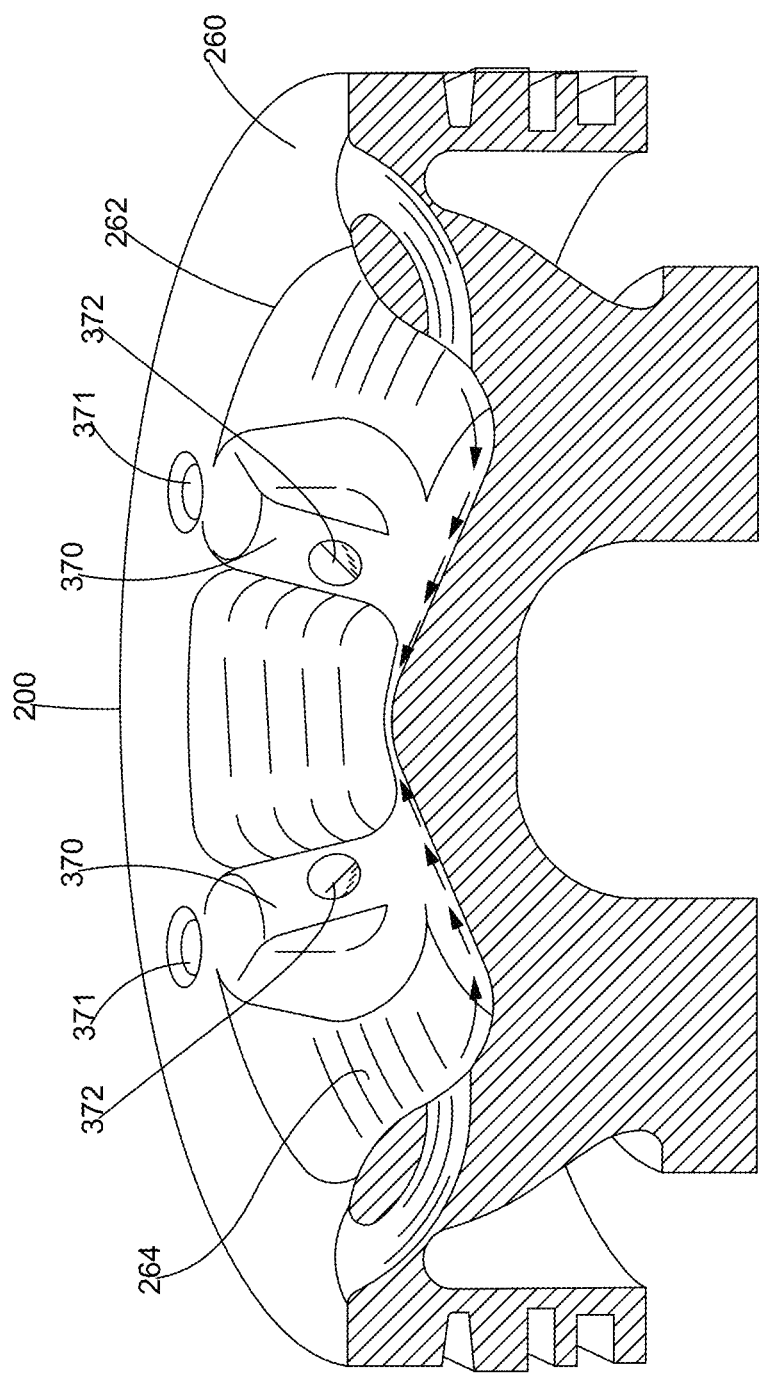
FIG. 5 is a cross-sectional view of the piston of FIG. 4 taken along line 5-5 of FIG. 4 in accordance with the present disclosure.

Turning now to FIG. 5, a cross sectional view of the piston 200 of FIG. 4 is illustrated. For convenience, the flow of unburned gas 305 of two of the fluid passageways 370 are illustrated in more detail that are representative of what occurs for each fluid passage 370 in each piston 200 in the present invention. Each fluid passage 370 is not limited to having only one ingress 371 and one egress 372. In an exemplary embodiment, the fluid passageways 370 may each have multiple ingresses 371 and multiple egresses 372. The fluid passageways 370 each having one ingress 371 and one egress 372 is used for convenience with respect to FIG. 5. The fluid passageways 370 in FIG. 5 are illustrated to follow curved paths, but may nevertheless also follow a straight path as mentioned above, or a combination of a straight path and a curved path. The fluid passageways 370 may also be completely enclosed between the ingresses 371 and egresses 372 or may have apertures or openings between the ingresses 371 and egresses 372. As also described above, when the unburned gas 305 reaches the piston crown 260, the piston crown 260 may compress the unburned gas 305 into the ingresses 371 of the fluid passageways 370. The unburned gas 305 may then flow through the fluid passageways 370 and exit through the egresses 372. As denoted by the directional arrows, the unburned gas 305 may then flow toward the center of the piston bowl 264, where there may then be a mixture of air and fuel within the piston bowl 264 that can promote soot oxidation and reduce soot formation. The passageways 370 may be provided in many different cross-sectional shapes with many different cross-sectional areas.

Figure 6:
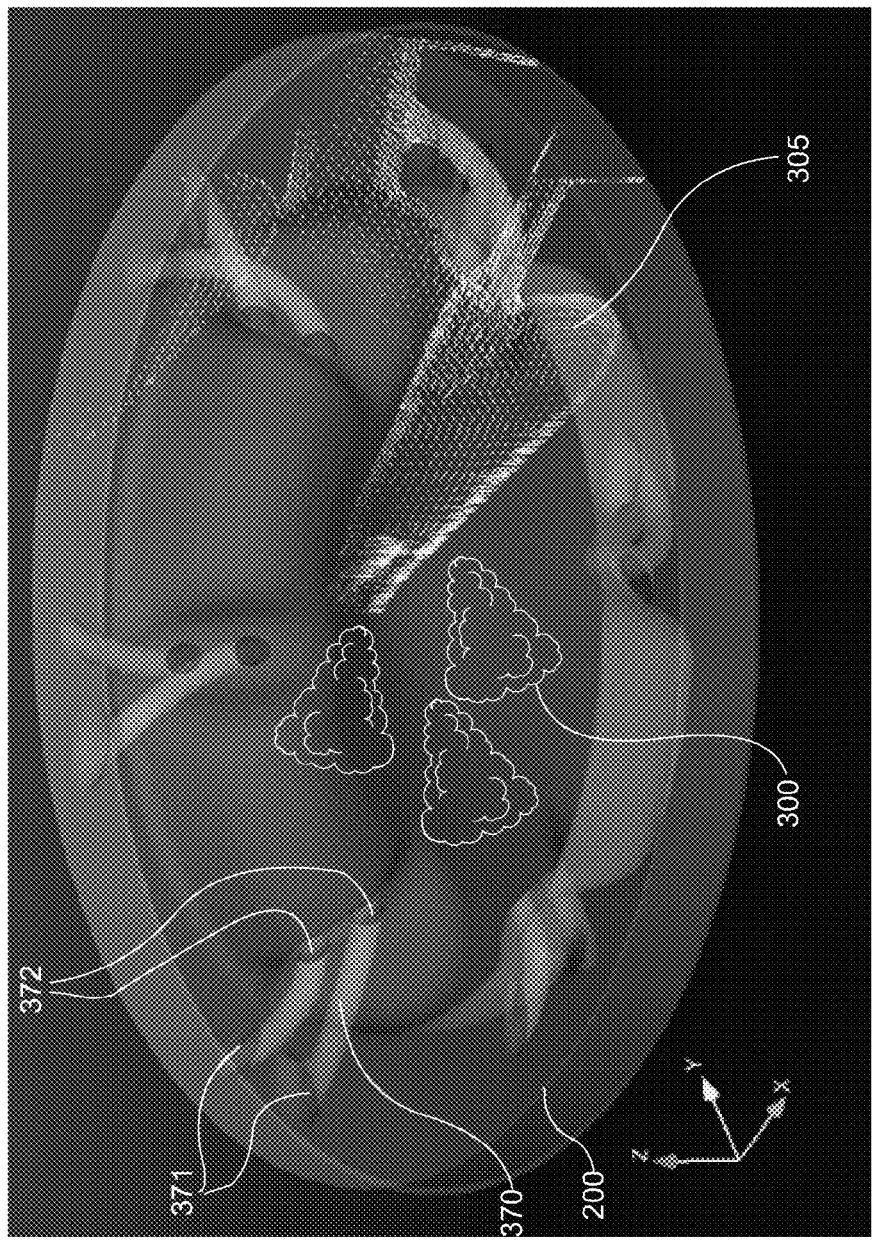
FIG. 6 is a gas/air velocity vector plot, or flow field plot showing how the air is moving in the piston and passages in accordance with the present disclosure.

Referring to FIG. 6, a velocity field plot of a piston 200 in accordance with the present disclosure is illustrated. In FIG. 6, the fluid passageways 370 are each configured with two ingresses 371 and two egresses 372. As explained above, the fluid passageways 370 in an exemplary embodiment could be configured with multiple ingresses 371 and multiple egresses 372. The flow of the unburned gas 305 within the piston bowl 264 is also shown in more detail. The velocity of the unburned gas 305 is also illustrated. As explained above, when the piston crown 260 compresses the unburned gas 305, the unburned gas 305 may then flow into both of the ingresses 371 in each fluid passageway 370. The unburned gas 305 may also flow out of the fluid passageways 370 through both egresses 372 of each fluid passageway 370. A plurality of flame plumes 300 are illustrated to be within the piston bowl 264. Three flame plumes 300 are illustrated in FIG. 6 for convenience. After the unburned gas 305 exits the egresses 372, the unburned gas 305 may then flow toward the flame plumes 300 where air and fuel can accordingly mix within the piston bowl 264 while preventing the flame plumes 300 from interacting with each other. As a result, soot oxidation within the piston bowl 264 is promoted, while soot formation may be reduced.

INDUSTRIAL APPLICABILITY

In general, the present disclosure may find utility of various applications but are not limited to the design and implementation of internal combustion engines such as diesel and Otto engines. Such engines may be employed as earth moving, prime movers, rail, marine or power generation equipment to improve combustion efficiency. The present disclosure does so by improving mixing of air and fuel, and improving the soot oxidation while also reducing the soot formation in a piston bowl 264. The present disclosure also enables unburned gas 305 that has not initially interacted with flame plumes 300 in a piston bowl 264 to flow into the piston bowl 264 and interact with the flame plumes 300 in the piston bowl 264. More specifically, the present disclosure provides fluid passageways 370 in the piston crown 260 that allows flow of compressed unburned gas 305 to flow from the piston crown 260 into the piston bowl 264. This ensures better mixing of air and fuel within the piston bowl 264 that would otherwise not occur. By using fluid passageways 370 within the piston crown 260, the present application provides a simplified and cost effective means of allowing for a greater mixing of air and fuel within a piston bowl 264 without compromising the structure of the piston 200.

Figure 7:
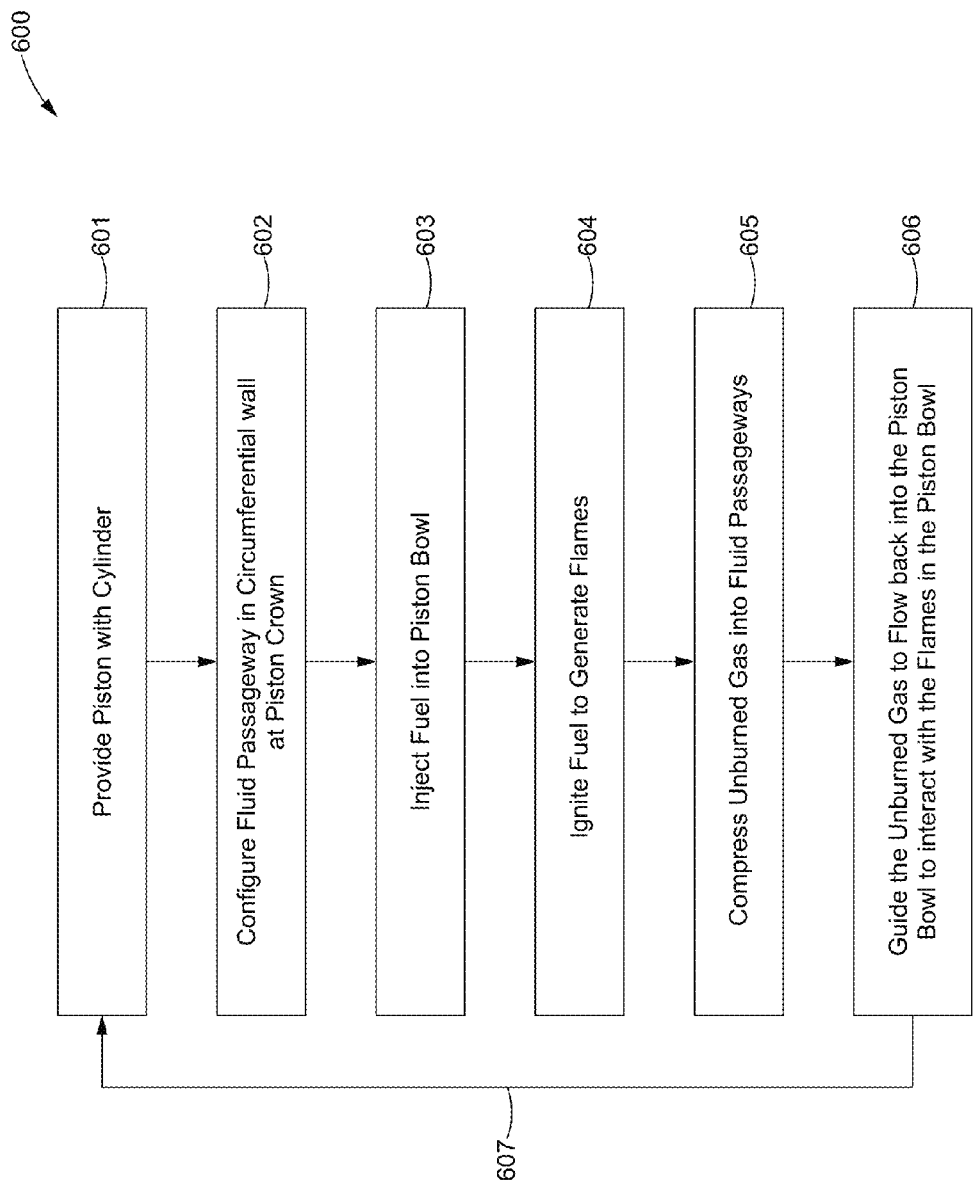
FIG. 7 is a flow chart depicting a simple sequence of steps that may be practiced in accordance with the method of the present disclosure.

Turning now to FIG. 7, an exemplary method 600 for operating an internal combustion engine in accordance with the present disclosure is illustrated. Starting in block 601, the piston 200 is provided so as to reciprocate in the cylinder 114. The piston 200 is itself further provided with a piston crown 260 having a circumferential wall 262 and piston bowl 264. In a next block 602, the fluid passageways 370 are configured within the piston crown 260. The fluid passageways 370 may also be configured with a varying cross sectional area, have a variety of shapes and have one or more ingresses 371 and one or more egresses 372 to best enable the flow of unburned gas 305 from the piston crown 260 to the piston bowl 264.

The method of FIG. 7 may include a block 603 wherein fuel is injected into the piston bowl 264 and then ignited in a block 604. In a block 605, the unburned gas 305 is compressed and forced through the fluid passageways 370. The unburned gas 305 enters the fluid passageways 370 through the ingresses 371. As mentioned above, the fluid passageways 370 may each have one or more ingresses 371 and may have follow a curved path, a straight path, or a mixture of a straight and curved path. The unburned gas 305 then flows through the fluid passageways 370 and exits the fluid passageways 370 through the egresses 372 and flows into the piston bowl 264. As describe above, each fluid passageway 370 may include one or more egresses 372.

In block 606, after the unburned gas 305 exits the egresses 372, the unburned gas 305 then flows toward the piston bowl 264 and interacts with the flame plumes 300 within the piston bowl 264 and allows for an increased mixing of air and fuel as a result. The operation of the engine 100 thus is more efficient as well.

The method of FIG. 7 may also be configured to concurrently perform and repeat the process described above in blocks 601-606 with respect to unburned gas 305 that has not interacted with the flame plumes 300 and continues to flow away from the piston bowl 264 as shown by block 607.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. An internal combustion engine, comprising:
an engine block having a plurality of cylinders;
a piston reciprocatingly mounted with each cylinder and defining a combustion chamber therebetween;
a fuel injector communicating fuel to the combustion chamber, the fuel creating a plurality of flame plumes when ignited;
a piston crown extending from the piston and defining a piston bowl, the piston crown including a circumferential wall terminating in a top ledge; and
a plurality of fluid passageways in the piston crown, each fluid passageway including an ingress in the top ledge and an egress in the circumferential wall proximate the piston bowl.

2. The internal combustion engine of claim 1, wherein the plurality of fluid passageways are completely enclosed.

3. The internal combustion engine of claim 1, wherein the piston crown is configured to compress unburned gas into the plurality of fluid passageways.

4. The internal combustion engine of claim 1, wherein the plurality of fluid passageways transport unburned gas to one or more fuel regions within the piston bowl.

5. The internal combustion engine of claim 1, wherein the plurality of fluid passageways are configured to follow at least one of a curved and a straight path.

6. The internal combustion engine of claim 1, wherein the plurality of fluid passageways are configured to accelerate a flow of the unburned gas.

7. The internal combustion engine of claim 1, wherein the piston is configured with at least six fluid passageways.

8. A piston comprising:
a cylindrical base;
a circumferential wall extending from the cylindrical base and terminating in a top ledge;
a piston bowl defined by the cylindrical base and the circumferential wall; and
a fluid passageway configured within the circumferential wall to receive unburned gas from the piston bowl through an ingress in a top ledge of the circumferential wall and transport the unburned gas back to the piston bowl through an egress in the circumferential wall, wherein the fluid passageway guides the unburned gas to a region with a higher equivalence ratio.

9. The piston of claim 8, wherein the circumferential wall is a top crown of the piston.

10. The piston of claim 8, wherein the piston includes a plurality of fluid passageways in the circumferential wall.

11. The piston of claim 9, wherein the top crown compresses the unburned gas into the fluid passageway.

12. The piston of claim 8, wherein fluid passageway is configured to have a plurality of ingresses and a plurality of egresses.

13. The piston of claim 8, wherein the fluid passageway is configured to guide the unburned gas to a plurality of fuel regions within the piston bowl.

14. The piston of claim 8, wherein the fluid passageway is configured to guide the unburned gas on a straight and curved path to the piston bowl.

15. A method for operating an internal combustion engine, the method comprising:
providing a piston within a cylinder, the piston having a piston crown with a plurality of fluid passageways therein, the piston crown defining a piston bowl;
injecting fuel into the piston bowl;
igniting the fuel and generating a plurality of flame plumes;
compressing unburned gas flowing away from the piston bowl into one of the plurality of fluid passageways; and
guiding the unburned gas within each fluid passageway to exit into the piston bowl to interact with the plurality of flame plumes travelling within the piston bowl.

16. The method for claim 15, wherein a number of the plurality of fluid passageways is greater than a number of the plurality of flame plumes travelling within the piston.

17. The method of claim 15, wherein the plurality of fluid passageways are configured in between the plurality of flame plumes travelling within the piston bowl.

18. The method of claim 15, wherein the fluid passageway is configured to guide the unburned gas toward a center of the piston bowl.

19. The method of claim 15, wherein the fluid passageway accelerates the unburned gas toward the piston bowl.

20. The method of claim 15, wherein the unburned gas continuously interacts with the plurality of flame plumes.

* * * * *